(12) United States Patent
Bonte et al.

(10) Patent No.: US 11,871,701 B2
(45) Date of Patent: Jan. 16, 2024

(54) BALING MACHINE INCLUDING A DRIVE-TRANSFERRING DRIVELINE

(71) Applicant: CNH Industrial America LLC, New Holland, PA (US)

(72) Inventors: Xavier G. J. M. Bonte, PB Zuidzande (NL); Frederik Demon, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 265 days.

(21) Appl. No.: 17/245,726

(22) Filed: Apr. 30, 2021

(65) Prior Publication Data

US 2021/0259156 A1    Aug. 26, 2021

Related U.S. Application Data

(63) Continuation of application No. PCT/EP2019/079709, filed on Oct. 30, 2019.

(30) Foreign Application Priority Data

Nov. 2, 2018  (EP) ..................... 18204215

(51) Int. Cl.
*A01F 15/08* (2006.01)
*A01F 15/04* (2006.01)
*A01D 69/08* (2006.01)

(52) U.S. Cl.
CPC .......... *A01F 15/0841* (2013.01); *A01F 15/04* (2013.01); *A01D 69/08* (2013.01)

(58) Field of Classification Search
CPC .... A01F 15/0841; A01F 15/042; A01F 15/04; B30B 9/3007; B30B 9/3021;

(Continued)

(56) References Cited

U.S. PATENT DOCUMENTS 3,525,302 A    8/1970   Eberly et al.
4,615,238 A *  10/1986  Cheatum ............. A01F 15/0841
                                              475/263

(Continued)

FOREIGN PATENT DOCUMENTS

DE       918 724          10/1954
EP       0819374 B1 *     7/1997  ............. A01F 15/08

(Continued)

OTHER PUBLICATIONS

English translation of EP 0819374 B1, retrieved in Mar. 2023, 5 pages (Year: 2023).*

(Continued)

*Primary Examiner* — Jimmy T Nguyen
(74) *Attorney, Agent, or Firm* — Peter K. Zacharias

(57) ABSTRACT

A baling machine includes a rotary drive-transferring driveline including a rotary input shaft that is connected to provide rotary drive as an input to a transmission; a flywheel shaft supporting a flywheel that is rotatably driven as an output of the transmission, the flywheel shaft connecting directly or indirectly to a plunger of the baling machine; and the transmission that is drive-transferringly interposed between the input shaft and the flywheel shaft. The transmission includes one or more clutches for selectively drivingly connecting the input shaft and the flywheel shaft one to the other inside the transmission and the flywheel shaft is free of clutches.

15 Claims, 5 Drawing Sheets

(58) Field of Classification Search
CPC . B30B 9/305; B30B 9/306; F16H 3/66; F16H 3/666; B60K 6/10; B60K 6/105; B60K 6/30; B60K 17/00; B60K 17/04; B60K 17/28; B60K 20/00; A01D 69/08
See application file for complete search history.

(56) References Cited

U.S. PATENT DOCUMENTS

| | | |
|---|---|---|
| 5,894,718 A | 4/1999 | Hawlas et al. |
| 2013/0152805 A1 | 6/2013 | Roth |

FOREIGN PATENT DOCUMENTS

| | | | | |
|---|---|---|---|---|
| EP | 2995192 A1 * | 3/2016 | ......... | A01F 15/0841 |
| WO | WO-2017116913 A1 * | 7/2017 | ............. | A01D 69/08 |

OTHER PUBLICATIONS

Notification of Transmittal of the International Search Report and the Written Opinion of the International Searching Authority, or the Declaration dated Nov. 25, 2019 for International Application No. PCT/EP2019/079709 (12 pages).
Extended European Search Report dated May 7, 2019 for European Patent Application No. 18204215.0 (6 pages).

* cited by examiner

BALING MACHINE INCLUDING A DRIVE-TRANSFERRING DRIVELINE

CROSS REFERENCE TO RELATED APPLICATIONS

This is a continuation of PCT application No. PCT/EP2019/079709, entitled "A Baling Machine Including a Drive-Transferring Driveline", filed Oct. 30, 2019, which is incorporated herein by reference. PCT application No. PCT/EP2019/079709 claims priority to European patent application EP 18204215.0, entitled "A Baling Machine Including a Drive-Transferring Driveline", filed Nov. 2, 2018, which is incorporated herein by reference.

FIELD OF THE INVENTION

The present invention relates to an agricultural baling machine, and, more particularly, to an agricultural baling machine including a drive-transferring driveline.

BACKGROUND OF THE INVENTION

Baling machines are well known in agriculture and are widely used to bale plant matter in fields into bales that may be conveniently and effectively handled, stored and used. Baling machines are known that bale forage products such as grass and other leaves used as hay or other types of animal feed; straw or other plant parts resulting as by-products from a harvesting operation such as combine harvesting; cotton; and other plant parts of commercial or other value.

The majority of baling machines in use in Europe are designed to be towed behind an agricultural tractor or another towing vehicle that, under the control of an operator and/or using operator-monitored software, moves the baling machine about a field and provides power to operate internal parts of the baling machine. The provision of power is effected by way of a rotatable power take-off (PTO) shaft connected to the rotary power take-off that typically is part of the tractor.

Known designs of agricultural baling machine include a pick-up, mounted at the front of the machine, that causes the ingestion of plant matter into the interior of the machine as it moves about a field. Differing internal designs of baler components are known in the part of the machine downstream of the pick-up.

One commonplace type of baling machine is often referred to as a "rectangular baler". This includes a cuboidal bale-forming chamber in which the ingested plant matter is compacted into a cuboidal shape by a piston or plunger that reciprocates longitudinally back and forth inside the bale-forming chamber between retracted and extended positions. Charges of plant matter repeatedly are fed into the bale-forming chamber from the pick-up by the mechanism of the baling machine. This action is timed with the motion of the plunger such that feeding of plant matter coincides with retraction of the plunger to one end of the bale-forming chamber. The plant matter then is compacted by subsequent extension strokes of the plunger along the bale-forming chamber.

The reciprocal rectilinear motion of the plunger is effected using a driveline that converts rotary drive derived from the rotating PTO shaft, connected to the baling machine above the pick-up, into reciprocal motion of the plunger. This typically is achieved by changing, in the driveline, the axis of the rotation from one parallel to the longitudinal length of the baling machine to an axis of rotation transverse thereto.

Such transverse-axis rotation is applied to a crank that is pivot-jointed to one end of a conrod the other end of which is pivot-jointed to the plunger. The latter is moveably captive inside the bale-forming chamber. As a result, rotation of the crank causes the reciprocal movement of the plunger.

A heavy flywheel is secured to a rotatable flywheel shaft that defines or is connected to an input shaft in turn connected in use to the PTO shaft.

The flywheel is needed because the plunger during its motion is associated with very high, and highly varying, levels of power that might peak at 1500 Hp (about 1100 kW). In the absence of the flywheel it might be impossible for the rotary power take-off of a tractor to provide sufficient power to move the plunger, and very high forces might be transmitted back towards the tractor via the PTO shaft potentially causing damage to the baling machine, the PTO or the tractor; or making the tractor-baling machine combination difficult to control.

The flywheel and the plunger present a system having a high level of inertia and, in some cases, mechanical resistance (especially when the driveline is at rest or is moving slowly). The inertia and mechanical resistance can be increased by factors such as:
 the at-rest plunger position causing an unfavourable conrod transmission angle with the consequence that plunger movement is difficult to initiate;
 plant matter in the bale-forming chamber resisting movement of the plunger; and/or
 larger, less compressible items, such as tree branches, litter and stones, impeding movement of the plunger in the bale-forming chamber.

Often the output power of the tractor that is connected to tow and power the baling machine is poorly matched to the energy requirements of such a system, and in some cases it is not known what the power output of the tractor may be. Such factors lead to numerous practical problems.

It is known to provide a slip clutch in the flywheel shaft. This is provided to cater for an overload condition arising e.g. because of a mismatch between the power output of the PTO of the towing tractor and the inertia represented by the flywheel and plunger combination. The presence of a slip clutch permits the input shaft to rotate when the torque it supplies is insufficient to initiate movement of the flywheel and plunger.

The presence of the slip clutch however is undesirable because it increases the cost of the flywheel shaft, that otherwise would be a simple component.

Moreover the slip clutch creates a maintenance burden. This is partly because of a need for at least annual stripping down of the slip clutch; and also because the plates of the clutch require regular greasing and pressure adjustment during a baling season. It is common for a baler operator to over-grease the clutch with the result that slip occurs too easily; and incorrect adjustment of the spring tensioners that determine the slipping torque of the slip clutch can cause excessive or insufficient slip to occur.

U.S. Pat. No. 5,894,718 A1 discloses a baling machine including a "pre-switching" transmission the transmission ratio of which is said to be variable through inclusion of a releasable coupling associated in some way with meshed bevel gears.

U.S. Pat. No. 3,525,302 A1 discloses a baling machine in which rotary drive for a flywheel is transmitted via a transmission. The transmission is constituted by a drive sheave and a further sheave that are drivingly interconnected by a belt. An overrunning clutch is provided in the driveline that powers the drive sheave in order to prevent driveline damage that would be caused by kinetic energy of the flywheel in the event of halting of the driveline parts.

It is an aim of the invention to solve or at least ameliorate one or more problems of prior art baling machine drivelines.

Embodiments of the invention are suitable for inclusion in all baling machine types and machinery combinations disclosed herein. The disclosure of embodiments or parts of embodiments herein includes their disclosure in combination with all baling machine types and machinery combinations described and/or implied herein, even if these are indicated as forming part of the prior art.

The terms "baling machine" and "baler" are used synonymously herein and in the art generally.

The term "power take-off" is synonymous with the acronym "PTO".

The term "tractor" embraces a wide variety of machines potentially capable of towing a baling machine, as will be known to the person of skill in the art.

The term "clutch" except as otherwise explained embraces any design of clutch that is suitable for transferring drive in the circumstances described.

The term "plant matter" and derivatives potentially includes all types of matter that potentially may be ingested into a baling machine for the purpose of being formed into bales.

The terms "piston" and "plunger" in the context of the principal, moveable, bale-forming part of a bale-forming chamber are used synonymously herein.

SUMMARY OF THE INVENTION

According to an embodiment described herein there is provided a baling machine including a rotary drive-transferring driveline including a rotary input shaft that is connected to provide rotary drive as an input to a transmission; a flywheel shaft supporting a flywheel that is rotatably driven as an output of the transmission, the flywheel shaft connecting directly or indirectly to a plunger of the baling machine; and a transmission drive-transferringly interposed between the input shaft and the flywheel shaft, wherein the transmission includes one or more clutches for selectively drivingly connecting the input shaft and the flywheel shaft one to the other inside the transmission and the flywheel shaft is free of clutches.

Such an arrangement dispenses with the flywheel shaft slip clutch of the prior art in favour of one or more clutches in a transmission forming part of a driveline as described herein. Such a transmission additionally may provide further benefits, as described below, that are not directly related to the elimination of the flywheel shaft slip clutch.

As a result of the arrangement defined herein the flywheel shaft may be simplified and may in engineering terms be designed as a very straightforward component that is cheap to manufacture, and robust. Also the maintenance and adjustment requirement of the flywheel clutch, indicated above, is eliminated. By providing one or more clutches in the transmission they can be made controllable and self-regulating in a way that the prior art flywheel slip clutches, being components with no intelligent control, are not. As a result the likelihood of insufficient or excessive clutch slip arising is greatly reduced, or even eliminated.

The flywheel shaft can include at least a first two degree-of-freedom joint, and more even two such joints. In certain embodiments the or each said two degree-of-freedom joint is or includes a universal joint.

These aspects permit the flywheel shaft to accommodate location variations that can arise from e.g. twisting or other forces that may cause the frame of a baling machine to become temporarily distorted during operation; or manufacturing tolerances that would make it impossible to accommodate a shaft omitting universal (or other, similar) joints.

In embodiments described herein the transmission can include at least one drive train including two or more meshing gears and a said clutch. However a wide variety of other transmission types is also possible, and the description of the particular form of transmission described herein is not limiting.

The or each said clutch can be a spooled wet clutch, but this also is non-limiting. Other clutch designs are possible within the disclosure hereof. A spooled wet clutch however is beneficial in a baling machine because it is able to cope with the high torques generated in such machines. This in turn is in part because a spooled wet clutch is cooled by flowing clutch fluid with the result that its performance typically is more consistent than that of a dry plate clutch.

Further the or each said clutch can be a spring-biased, electro-hydraulically actuated clutch. One advantage of such clutches is that they can react very quickly (e.g. in milliseconds) to commands and sensed, prevailing conditions. As a result the one or more clutches in the transmission may be "intelligent" in the sense of being able to respond very quickly, and to an appropriate degree, to situations requiring that they open (disengage) or close (engage).

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
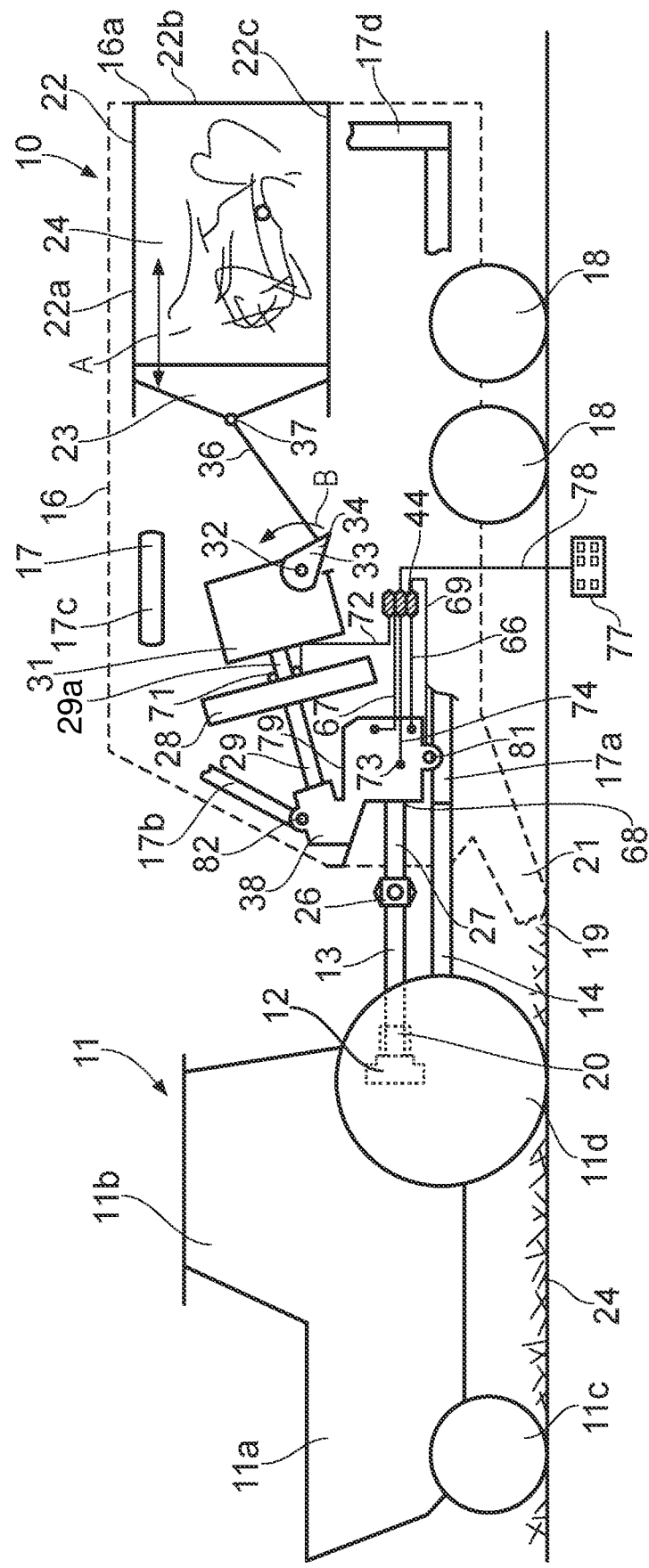
FIG. 1 is a schematic representation of a tractor-baling machine combination in accordance with embodiments described herein.

Referring to the drawings a baling machine 10 is shown being towed behind a towing vehicle that in the illustrated embodiment non-limitingly is an agricultural tractor 11.

The tractor 11 is a conventional tractor including a vehicle frame/body 11a, rear-mounted cab 11b, front, steerable, ground-engaging wheels 11c and rear, driven, ground-engaging wheels 11d. Tractor 11 includes at its rear end between the rear wheels 11d a power take-off 12 of a conventional design that includes a rotative coupling for a PTO shaft 13 that extends rearwardly of the tractor 11. The PTO 12 may be engaged to cause rotation of the PTO shaft 13 or disengaged, such that the shaft 13 is not powered to rotate, for example through the operation of a control lever or pushbutton.

The tractor 11 may have any of a range of engine power outputs including but not limited to 200 hp, 300 hp and 400 hp. The baling machine 10 is operable when towed by any such tractor 11, without a need for adjustment or modification, for the reasons explained below.

The PTO shaft 13 may be any of a variety of lengths. A relatively short PTO shaft 13 and drawbar 14 (described below) minimizes the distance between the pick-up 19 (described below) of the baling machine 10 and the tractor 11. This provides certain advantages, although in some other respects a longer PTO shaft 13 may provide good adjustment flexibility.

The partial driveline represented by the PTO 12 and PTO shaft 13 may in various types of tractor include a PTO clutch 20 that as described above seeks to protect the engine of the tractor 11 from damage caused e.g. when an excessive loading on the PTO shaft causes engine stalling. The PTO clutch 20 is shown schematically in FIG. 1. It may readily be envisaged by the person of skill in the art and typically would be a one-way clutch of a kind that permits free movement when rotating in one direction, and transfers rotary drive via the PTO shaft 13 when rotating in the opposite direction. Other forms and locations are possible in respect of the clutch 20.

The baling machine 10 is secured to the rear of the tractor 11 by way of a drawbar 14 that typically is of an "A"-shape when viewed in plan and extends forwardly of the baling machine 10 below the PTO shaft 13. The drawbar 14 is pivotably secured to a conventional towing hitch at the rear of the tractor 11.

The baling machine 10 includes a housing or cover 16 that may take a variety of forms. The housing 16 in most baling machine designs includes a section 16a that is open to permit ejection of formed bales at the rear of the baling machine 10.

Panels defining the housing 16 further may be openable or removable in order to permit maintenance of the interior parts of the baling machine 10 replacement of bobbins of twine used for tying completed bales or the clearance of blockages that can arise for a variety of reasons.

The housing 16 of the baling machine 10 is secured to a baling machine frame 17 selected parts 17a, 17b, 17c, 17d of which are illustrated in FIG. 1, with the complete frame 17 being omitted for ease of illustration.

The baling machine 10 is mobile and to this end it includes secured to the frame 17 two or more ground-engaging wheels 18.

In the embodiment illustrated four wheels are provided, being left and right front wheels and left and right rear wheels 18. In FIG. 1 the left-hand side front and rear wheels are visible.

In this regard the front or forward end of the baling machine 10 is the end of it that is closest to the towing tractor 11, and the terms "rear", "left", "right", "upper", "lower" and derivative terms are interpreted accordingly and as though an observer is looking forwardly along the baling machine 10.

The wheels 18 may be mounted relative to the frame 17 by way of suspension components and passive or active steering components as would be known to the person of skill in the art, or they may be mounted more simply. The wheels 18 optionally may include tires and/or gripping elements that are omitted from FIG. 1 for ease of viewing.

A pick-up 19 projects forwardly of the baling machine 10 and is arranged to collect cut plant matter 24 lying in a field in which the baling machine 10 moves as influenced by the motion of the tractor 11. The pick-up 19 passes the plant matter to a conveyor 21. The conveyor 21 conveys the plant matter inside the baling machine 10 where it undergoes baling.

Numerous designs of pick-up 19 and conveyor 21 are known in the baling machine art and fall within the scope of embodiments disclosed herein. The precise designs of the pick-up 19 and conveyor 21 are essentially immaterial to the nature and operation of the invention, and therefore are not described in detail.

As mentioned, the baling machine 10 includes an internal bale-forming chamber 22. This is an elongate, cuboidal volume defined by chamber walls of which top and bottom walls 22a and 22c are visible in FIG. 1. The bale-forming chamber 22 in a typical baling machine design extends in a fore and aft direction in an upper part of the rear of the volume enclosed by the housing 16.

The rear 22b of the bale-forming chamber coincides with the aforementioned open housing section 16a in order to allow ejection of completed bales in a per se known manner.

A crop flow path exists inside the baling machine 10 between the conveyor 21 and the bale-forming chamber 22. The crop flow path may readily be envisaged and is omitted from the figures for clarity.

The forwardmost end of the bale-forming chamber 22 is essentially open. A plunger 23 occupies the interior cross-section of the bale-forming chamber 22 and is constrained to move longitudinally inside the chamber 22 from the open, forward end towards and away from the rear wall 22b as signified by arrow A.

Figure 4:
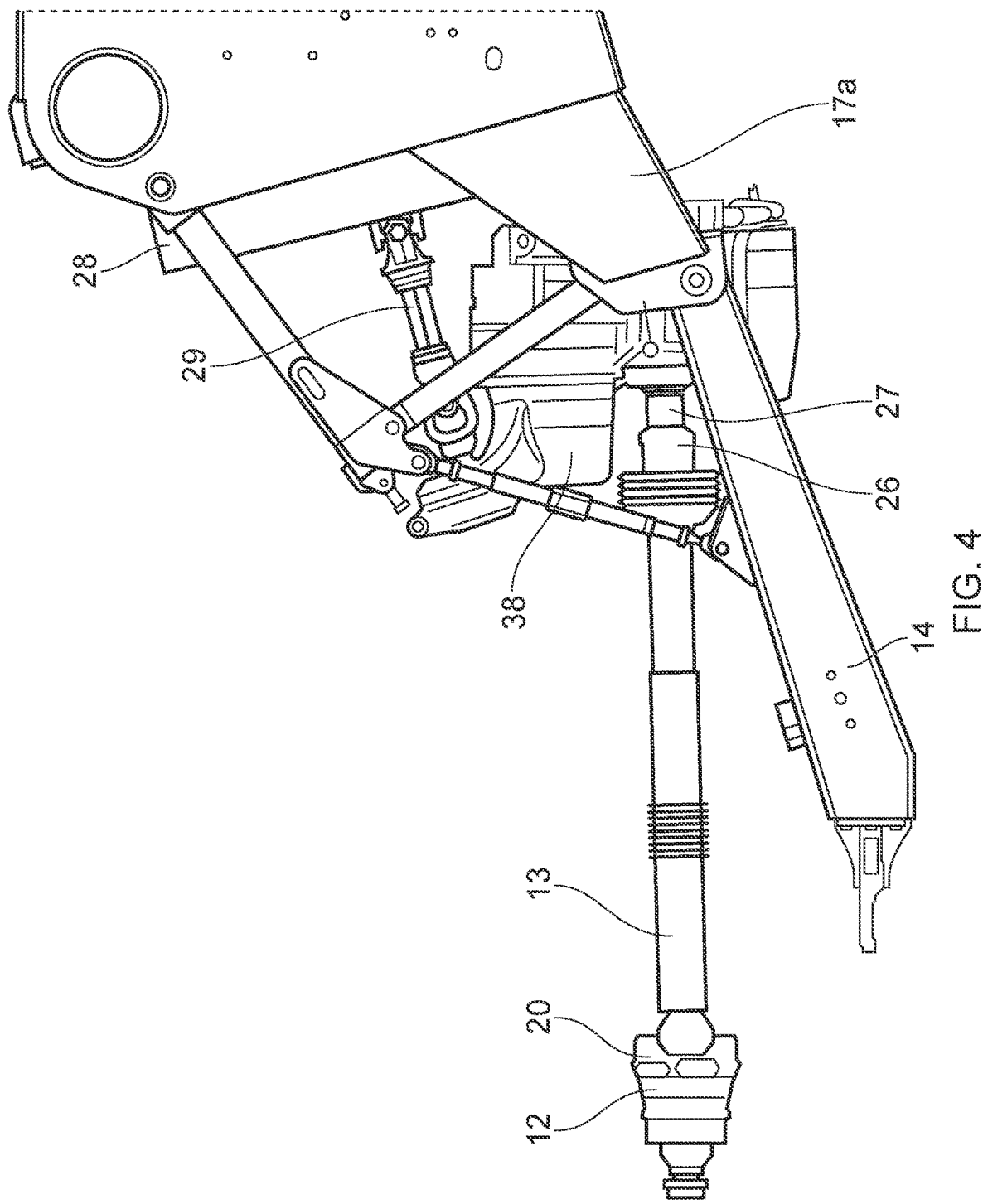
FIG. 4 is a side elevational view of certain parts of FIGS. 1 to 3 in more detail, showing features of a flywheel shaft in more detail.
Figure 5:
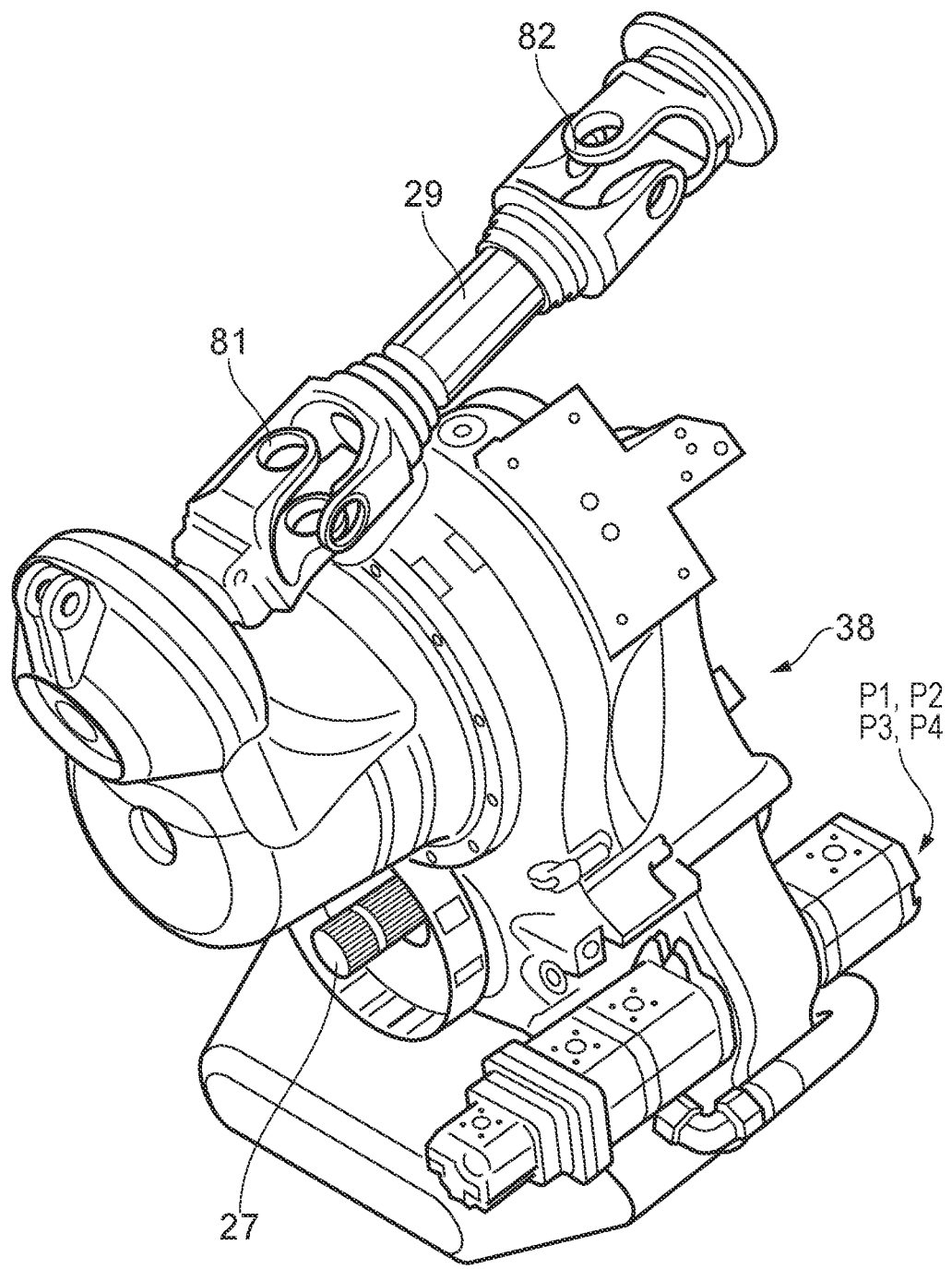
FIG. 5 is a perspective view of a transmission and flywheel shaft that are visible in FIGS. 1 to 4.

The PTO shaft 13 as mentioned may be powered to rotate, in virtually all tractors in a clockwise direction when viewed from behind the tractor 11. PTO shaft 13 is connected by way of at least one, and in practice at least two, universal joints 26 to the forwardmost end of a rotary input shaft 27 of the baling machine 10. The universal joint 26 in a well-known manner accommodates changes in the relative orientation of the tractor 11 and baling machine 10 that result from towing of the baling machine from place to place, e.g. while the baler is working or when it is travelling between fields. In FIG. 1 the arrangement and relative positions of the universal joint 26 and rotary input shaft are shown in a schematic form in order to illustrate a constructional principle of the baling machine 10. An alternative arrangement is shown in FIGS. 4 and 5 described herein.

The input shaft 27 is supported e.g. using journal bearings that are omitted from the figures for ease of viewing and connects by way of a driveline, described in more detail below, to a rotatable flywheel 28.

Flywheel 28 is supported on a flywheel shaft 29 that also is supported using journal bearings, or a functionally similar arrangement, that further is omitted from FIG. 1. The functions of the flywheel 28 are as described above.

The rear end 29a of the flywheel shaft 29 is a rotary input to a drive converter 31 or similar transmission that by way of intermeshing gear components alters the axis of rotation of rotative energy in the baling machine 10.

The nature of the drive converter 31 thus is such that the longitudinally extending (with reference to the elongate length of the baling machine 10 as illustrated) axis of rotation of the flywheel shaft 29 becomes rotation about a transversely extending axis of a crankshaft 32.

Crankshaft 32 is connected as shown to a crank member 33 that protrudes from the drive converter 31 in a manner presenting a free end 34. The free end 34 is pivotably connected to one end of a conrod 36 the other end of which is pivotably connected, as indicated by numeral 37, to the forward side of the plunger 23.

As is apparent from FIG. 1 therefore, rotation of crankshaft 32 causes rotation of crank 33, as signified by arrow B, that gives rise to the rectilinear, reciprocal motion of plunger 23 indicated by arrow A.

In this regard it is somewhat arbitrary whether crank 33 rotates clockwise or anti-clockwise, since reciprocal motion of the plunger 23 may in an appropriately designed set of driveline elements be achieved regardless of the direction of rotation of the crank 33. The actual rotational direction of the crank 33 would be a consequence of the internal design of the drive converter 31. Such aspects are not relevant to an understanding of the invention, and therefore are not provided in detail herein.

Charges of plant matter 24 conveyed inside the baling machine 10 from the conveyor 21 repeatedly are at intervals fed by internal components of the baling machine 10, that are omitted from FIG. 1 for clarity, into the interior of the bale-forming chamber 22 for compaction by reason of the reciprocal, rectilinear motion (arrow A) of the plunger 23. The feeding of each charge of plant matter 24 is timed to coincide with positioning of the plunger 23 at its retracted, i.e. forwardmost position, with the result that the plant matter 24 becomes compressed and compacted by the movement of the plunger 23 into bale form after it has been fed in to the bale-forming chamber 22.

The driveline defined between the input shaft 27 and the flywheel shaft 29 includes a transmission 38 that is described below in relation to FIGS. 2 and 3.

Figure 2:
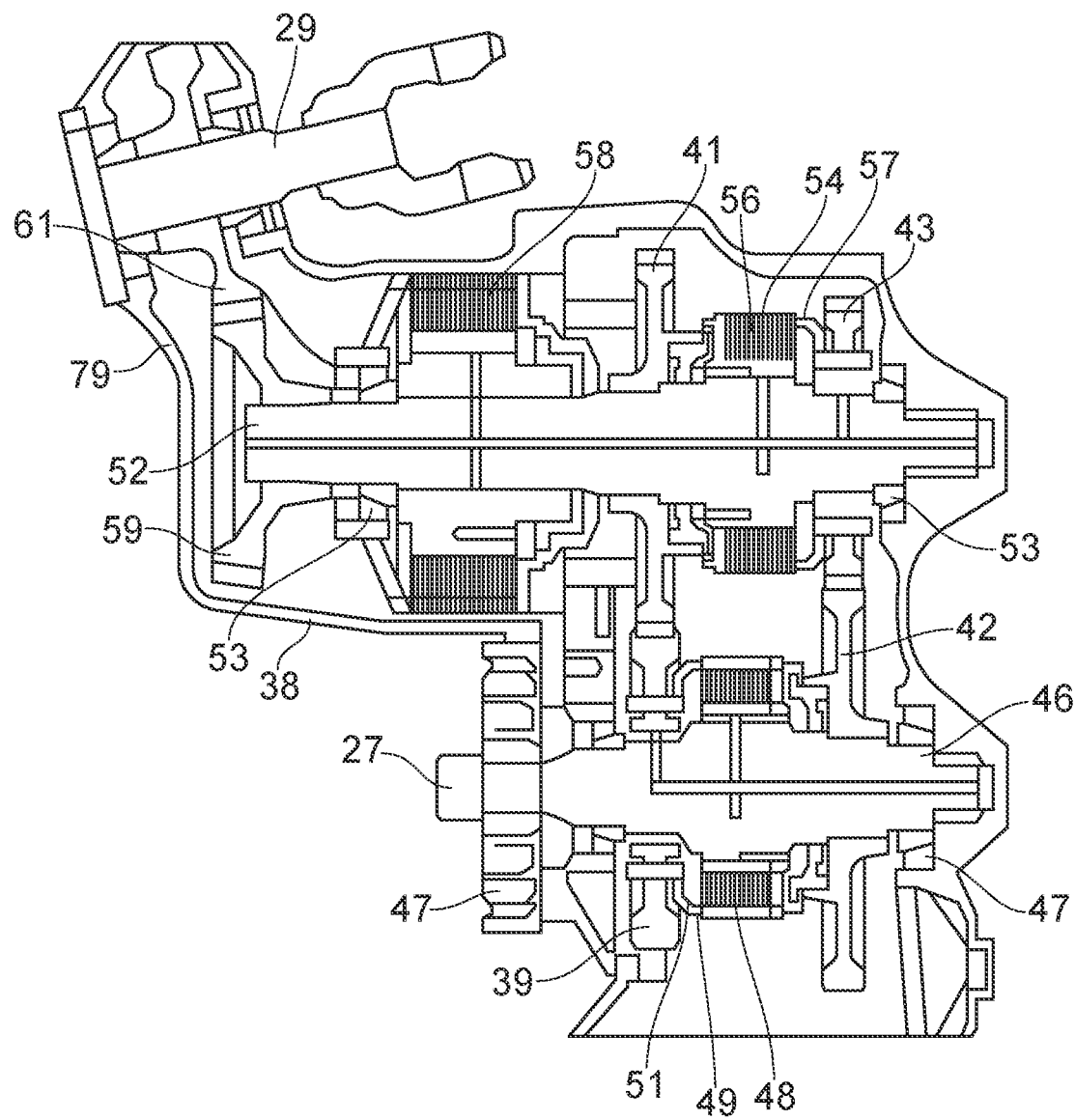
FIG. 2 is a cross-sectional view of a transmission, forming part of the baling machine visible in FIG. 1, according to embodiments described herein.
Figure 3:
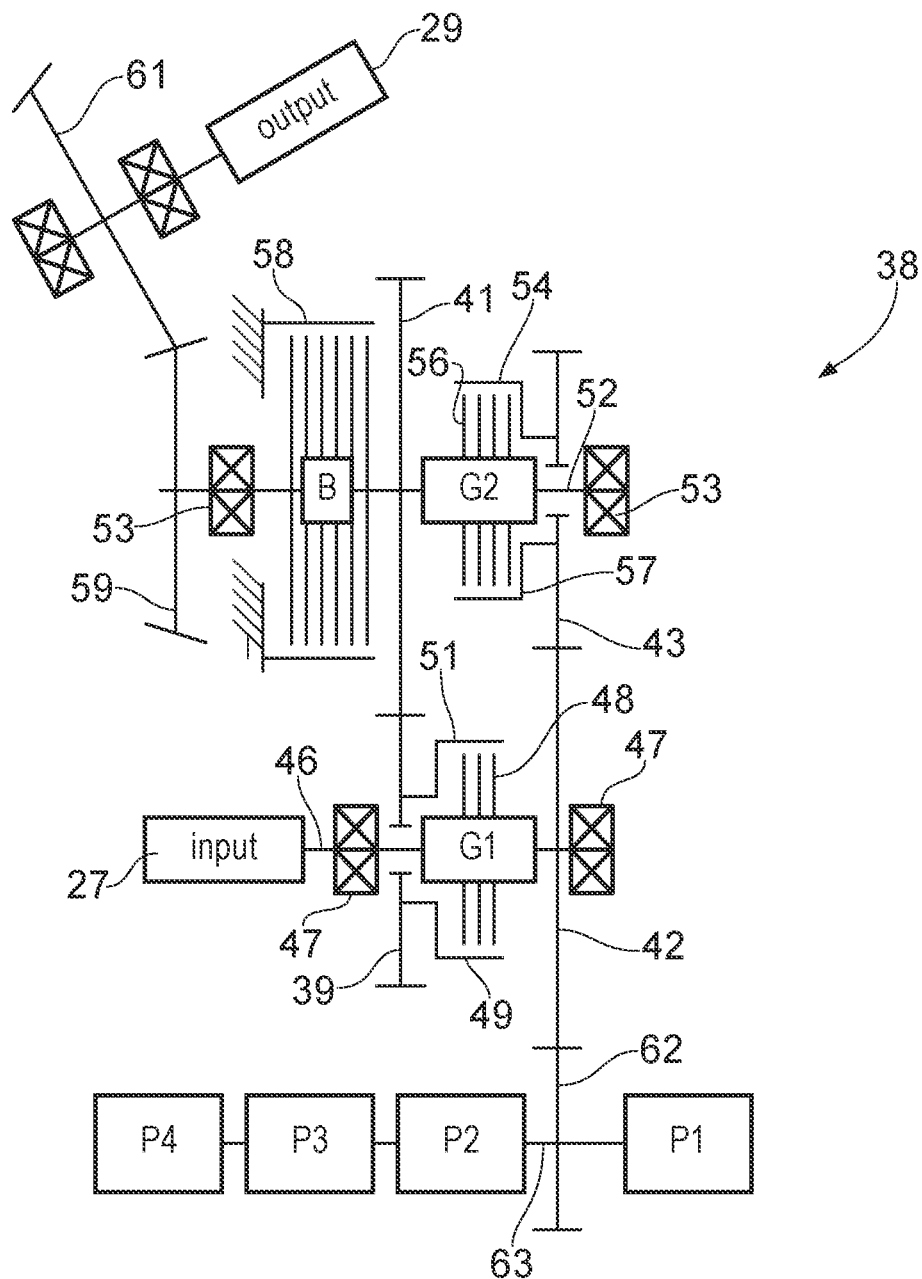
FIG. 3 is a schematic representation of the driveline components of the transmission of FIG. 2.

In FIGS. 2 and 3 the rotary input shaft 27 connects to respective first and second selectable transmission ratios 39, 41; 42, 43 forming part of a drive train defined by drive train components within the transmission 38 and therefore existing between the input shaft 27 and the drive converter 31.

The first transmission ratio is defined by mutually meshing, rotary, toothed gears 39, 41 that each are supported for rotation within the transmission 38. The first transmission ratio 39, 41 is a relatively great reduction ratio transmission providing a high degree of mechanical advantage.

As used herein, a relatively great reduction ratio transmission is one giving rise to a relatively great reduction in the rotary output speed across the transmission ratio, and hence a relatively great mechanical advantage. References to a relatively small transmission ratio are to be construed accordingly and hence these give rise to a lesser mechanical advantage, and higher rotary output speed, than the relatively great reduction ratio.

The second transmission ratio is defined by mutually meshing, rotary, toothed gears 42, 43 that each are supported for rotation within the transmission 38 adjacent the gears 39, 41 in a manner defining a parallel drive train to that represented by first ratio 39, 41. The second transmission ratio 42, 43 is a relatively small ratio transmission providing a higher speed of output shaft rotation than the first transmission ratio.

The baling machine 10 includes a controller non-limitingly illustrated schematically in FIG. 1 in the form of a programmable microprocessor 44. The baling machine 10 includes a source of electrical power, for the microprocessor 44, that in certain embodiments may take the form of a rotary generator that is driven directly or indirectly by the PTO shaft, although other sources of electrical power including batteries and other storage devices, or other types of generator, are possible. Combinations of electrical power sources furthermore are possible.

As indicated the controller may take a variety of forms and need not be a microprocessor as illustrated, or a single component.

The microprocessor 44 is capable (typically but not necessarily as a result of software and/or firmware programming) of selectively engaging the first 39, 41 or the second 42, 43 transmission ratio. The arrangement of the components and/or the programming of the microprocessor 44 prevents the first and second transmission ratios from being selected simultaneously.

As best illustrated in FIGS. 2 and 3, the input shaft 27 rigidly connects to an input gear shaft 46 that is supported (non-limitingly in the embodiment illustrated by way of journal bearings 47 at either end) for rotational movement inside the transmission 38. Input gear shaft 46 is locked to gear 42 such that gear 42 always rotates with input gear shaft 46.

Input gear shaft 46 is also locked to an input side 48 of first transmission clutch 49 forming part of the drive train. As a result the input side 48 of first transmission clutch 49 also rotates with the input gear shaft.

First transmission clutch 49 is e.g. electrically or electro-hydraulically activated in the described embodiment, and is selectively engageable under command from the microprocessor 44. When engaged the output side 51 of the first transmission clutch 49 is locked to the input side 48 and rotates therewith.

The output side 51 of first transmission clutch 49 is locked to gear 39 of first transmission ratio 39, 41 such that gear 39 rotates with the output side 51.

In the illustrated embodiment the first transmission clutch 49 lies on input gear shaft 46 intermediate gears 39 and 42, but as will occur to the person of skill in the art this need not be the case, and other clutch and gear position combinations are possible.

As explained gears 42 and 43 are mutually meshed, with gear 43 supported on rotational intermediate gear shaft 52. Intermediate gear shaft 52 is supported (in the non-limiting example shown by way of journal bearings 53 at either end) for rotation relative to the remainder of transmission 38.

By reason of locking of input gear shaft 46 to gear 42, gear 43 rotates whenever input gear shaft 46 rotates, at a speed, relative to the speed of input gear shaft 46, determined by the gear tooth ratio between gears 42 and 43. However, gear 43 merely idles unless a second transmission clutch 54, which may be of a similar design to first transmission clutch 49 and hence operable under command of the microprocessor 44, is engaged.

In this respect intermediate gear shaft 52 is locked to an input side 56 of second transmission clutch 54; and an output side 57 is locked to gear 43. As a result when the clutch is engaged rotation of gear 43 is transmitted via intermediate gear shaft 52.

Gear 39 is meshed with gear 41 as explained. Gear 41 is locked to intermediate gear shaft 52. Clearly therefore to avoid locking up of the transmission it is essential that only one of the transmission clutches 49, 54 is engaged at a time. When the first transmission clutch 49 is engaged and the second transmission clutch 54 is disengaged, drive from the input shaft 27 is transmitted via meshed gears 39 and 41 to drive intermediate gear shaft 52 in accordance with the relatively great reduction transmission ratio "G1" determined by the numbers of teeth of gears 39 and 41. At this time gears 42 and 43 rotate in an idling manner.

When first transmission clutch 49 is disengaged and second transmission clutch 54 is engaged the drive of the input shaft 27 is transmitted via gears 42 and 43 to drive intermediate gear shaft 52 in accordance with the relatively small transmission ratio "G2" determined by the numbers of teeth of gears 42 and 43.

It is possible for both the clutches 49, 54 to be disengaged simultaneously. In that case gears 42 and 43 would rotate, but no drive would be transmitted to intermediate gear shaft 52.

Intermediate gear shaft 52 includes mounted thereon an optional brake 58 that may be employed when both the transmission clutches 49, 54 are disengaged to slow the flywheel shaft 29. The latter receives the rotary drive of intermediate gear shaft 52, when one of the transmission clutches 49, 54 is closed, via meshed output gears 59, 61.

The numbers of teeth of the gears 39, 41, 42, 43, 59 and 61 may be varied extensively in all the gears of the transmission 38 depending on the precise design of the transmission 38. The overall numbers of drive-transferring components in the transmission may be varied. Also as explained the drive train elements defining the transmission ratios need not be meshing, toothed gears and instead may adopt a range of other forms, including but not limited to the examples given above.

Gear 42 as illustrated in FIG. 3 may optionally additionally mesh with an auxiliary drive gear 62 that also may be supported in the transmission 38 to co-rotate with input gear shaft 46 in accordance with a transmission ratio determined by the relative numbers of teeth of gears 42 and 62.

Gear 62 is locked to an auxiliary drive shaft 63 that is supported e.g. in journal bearings for rotation with gear 62. Auxiliary drive shaft can be connected to drive one or more hydraulic pumps P1, P2, P3, P4 that may be used to energise one or more hydraulic circuits that are not shown in the drawings hereof. Such circuits may control the operation of a range of actuators that perform auxiliary functions in the baling machine 10.

The transmission clutches 49 and 54 may be for example electrically (e.g. solenoid) operated, electro-mechanically operated or electro-hydraulically operated, under the control of the microprocessor 44. The clutches can be spring biased, e.g. to a normally engaged position. Thus very rapid engagement and disengagement of the clutches 49, 54 is possible, for example in a few milliseconds. The person of skill in the art readily is able to embody clutches of the type described.

Optionally but not essentially the transmission clutches 49, 54 are spooled wet clutches the nature of which is familiar to the person of skill in the art and therefore does not require describing in detail herein. Wet clutches generally are highly suitable for computer or other electronic control, leading to rapid clutch engagement and disengagement.

FIG. 3 shows that the clutches 49, 54 each have the same number of plates in the illustrated embodiment, but this need not be the case. Unequal numbers of clutch plates therefore are possible.

One form of control of the transmission clutches 49, 54 is illustrated schematically by electrical control signal line 66 that transmits commands from the microprocessor 44 to first transmission clutch 49; and control line 67 that transmits commands from the microprocessor 44 to second transmission clutch 54.

Two-way communication between the transmission clutches 49, 54 and the microprocessor 44 optionally is possible, either using the signal lines 66, 67 or by another means. Using two-way control the transmission clutches 49, 54 can signify e.g. their operational (i.e. engaged or disengaged) status, information on the condition of wear parts such as friction plates, levels of clutch fluid in the event of the clutches being wet clutches as is optional and similar operational variables. The microprocessor 44 can generate commands and/or warning signals in dependence on the signals received from the transmission clutches 49, 54. Thus the clutches 49, 54 provide for "intelligent" control of the selection of drive via the driveline.

The microprocessor 44 determines the transmission ratio to be selected in dependence on conditions prevailing in the baling machine, as determined by the outputs of a number of sensors described herein.

As explained in the majority of operational situations it is desirable to reduce or optionally eliminate slip of any clutches, such as clutches 49, 54, forming part of the driveline between the input shaft 27 and the flywheel shaft 29. Sensing of slip in the clutches and transmitting output signals, indicating the degree of slip, to the microprocessor 44, are therefore provided for in the baling machine 10.

One way of sensing slip is to sense the rotational speeds of the input shaft 27 and flywheel shaft 29, and compare the sensed speeds (adjusting for the effective prevailing transmission ratio engaged by way of the transmission 38). To this end a first rotational speed sensor 68 senses the speed of input shaft 27 and generates a signal proportional thereto. This signal can be transmitted via electrical signal line 69 to the microprocessor 44, although other means of signal generation and transmission (including wireless methods) are possible.

A second rotational speed sensor 71 senses the speed of flywheel shaft section 29a and generates a signal proportional thereto. This signal is transmitted via electrical signal line 72 to the microprocessor 44. As in the case of the first sensor 68, other signal generation and transmission options are possible. Calibration and subtraction of the speed signals from one another gives rise to a slip signal that is proportional to the degree of slip in the clutch 49 or 52 that is engaged at the time of sensing.

When one or more transmission clutches forming part of the drive train of the baling machine 10 is a wet clutch as is optional, a clutch fluid flow circuit is provided. This conveys clutch fluid via the clutches, thereby giving rise to fluid "upstream" and "downstream" sides of the clutches in the fluid flow circuit. It is possible to sense the temperature of oil in the flow circuit and use this as an indication of clutch slip. For the most accurate fluid temperature-based indication of clutch slip the temperature is sensed immediately downstream of the clutches.

To this end the baling machine 10 optionally includes one or more temperature sensors for one or more of the clutches as schematically represented by numeral 73 and connected to the microprocessor 44 via electrical signal line 74 (or by another signal transmission means, including but not limited to wireless connection). The temperature sensor 73 is arranged as stated to measure the temperature of a fluid, such as the oil of a wet clutch, in a flow circuit forming part of the transmission 38. The sensor 73 generates signals indicative of the sensed temperature and these when received by the microprocessor 44 can be used to indicate whether slip is occurring in the clutch in question.

A temperature-based slip indication signal can be used in its own right to indicate slip, or it may be used to augment another slip indication such as a shaft speed comparison as described above. A temperature signal also can be used for example to help determine a recovery delay following overloading of the transmission 38.

Thus if for example slip of a clutch in the transmission 38 causes the temperature of clutch oil to rise this will be sensed by the temperature sensor 73 and a clutch rapid disengagement routine called. The microprocessor 44 then can call a routine that delays re-engagement of the clutch in question for a calculated or predetermined recovery period. Alternatively the microprocessor 44 can command repeated sampling of the oil temperature using the sensor 73 until the temperature is below a threshold value, with re-engagement of the clutch being inhibited until such a temperature is attained.

Although a single temperature sensor 73 is illustrated, this is purely to exemplify the described embodiment. Plural numbers of temperature sensors are possible and indeed likely bearing in mind the plural number of clutches provided.

As is apparent from the foregoing description, the transmission 38 in the described embodiment includes two drive transfer paths (respectively via the first, relatively great reduction transmission ratio 39, 41 (G1) and the second, relatively small transmission ratio 42, 43 (G2)) having a common output in the form of the output gears 59, 61 and the flywheel shaft 29, and of which only one drive transfer path at a time is connected in the transmission. Also as is apparent there is provided a respective clutch 49, 54 controlling whether each drive transfer path is engaged.

The sensor arrangement 68, 71 for sensing slip is capable of sensing slip in either of the drive transfer paths and hence in either of the clutches 49, 54, depending on which of them is engaged. This is so notwithstanding that sensors 68, 71, measuring the rotational speed of the input shaft 27 and the flywheel shaft 29, indicate slip in the two drive transfer paths in common.

As also is apparent from the foregoing, the microprocessor 44 is capable of selectively disengaging rotary drive between the input shaft 27 and the shaft 29 supporting the flywheel 28. This possibility is explained further below in connection with operational sequences made possible by the apparatus of the invention.

In this regard an operational method of the baling machine 10 can be for the microprocessor 44 initially to command engagement of the first transmission ratio 39, 41 during starting up of the baling machine 10, when the flywheel 28 is normally at rest. At such a time a maximal force is required to initiate movement of the flywheel, especially if the plunger 23 starts from a position in the bale-forming chamber 22 giving rise to an adverse transmission angle of the conrod 36 relative to the crank 33. Resistance of the plunger 23 to movement also may for various reasons vary from place to place along the bale-forming chamber with the result that certain plunger positions may give rise to a very high overall resistance to motion.

Engagement of the first transmission ratio 39, 41 (G1) ameliorates the high resistance problem, by providing a drive transfer path associated with a large mechanical advantage. As a result it is expected that matching of the output of the tractor PTO 12 to the load requirement represented by the flywheel and plunger combination 28, 23 will be improved compared with the prior art. It further is expected therefore that initiation of movement of the plunger 23 will reliably be achieved in normal circumstances, essentially regardless of the maximum output of the tractor PTO 12.

Driving of the flywheel 28 by way of the first transmission ratio G1 permits the speed at which the plunger 23 reciprocates to increase from rest to an intermediate speed that is less than the normal operational speed. Once the intermediate speed is reached the microprocessor 44 then commands disengagement of first transmission clutch 49, thereby disengaging first transmission ratio 39, 41; and engagement of second transmission clutch 54.

The latter step causes engagement of the second transmission ratio 42, 43 (G2). This permits further acceleration of the flywheel 28 to its operational speed of reciprocation.

The intermediate speed may be programmed into the microprocessor 44. In the event of the controller being non-programmable a permanent logic regime (as may be provided by e.g. Op Amps or hydraulic logic circuits) may be employed, instead of a programmable logic, to effect the indicated transmission shift from the first to the second transmission ratio.

Once the flywheel 28 has been accelerated to its operational speed the energy required under normal circumstances to maintain the operational speed peaks at a considerably lower level than is required during acceleration of the flywheel 28.

The foregoing means that the baling machine 10 of the invention is capable of successful operation even if the power or torque output of the tractor PTO 12 is less than would otherwise be required in a prior art baling machine to move the flywheel 28 from rest and accelerate it to its operational speed. This is chiefly because in an early phase of acceleration of the flywheel 28 the first transmission ratio 39, 41 is engaged and the mechanical advantage this provides means even a low power output PTO acceptably is matched to the plunger energy requirement.

Should slip of the first transmission clutch 49 occur during acceleration of the plunger 23 from rest this would be detected by the sensors described above. In the event of the degree of slip exceeding a threshold (that in like manner to the intermediate speed may be programmed or may be permanently set, depending on the nature of the controller) the microprocessor 44 can take a series of remedial steps aimed at achieving successful baling machine start-up notwithstanding that a clutch is slipping.

As a primary remedial action the microprocessor 44 can command disengagement of the first transmission clutch 49, thereby disengaging drive via the first transmission ratio 39, 41. When the first transmission clutch 49 is a solenoid-driven spooled wet clutch as is optional such disengagement may be effected very rapidly, before the slipping causes serious damage to the clutch 49. Moreover a wet clutch is less likely than a dry clutch to suffer slip-derived damage, since the clutch oil is capable of conveying heat away from the clutch plates in a manner minimizing the chance of overheating occurring.

Following such disengagement the microprocessor 44 can seek to achieve re-engagement of the first transmission clutch 49. This can be after a delay to allow cooling of the clutch 49. The delay can be based on the elapsing of a period of time after the detection of slip or, if a temperature sensor such as sensor 73 is provided, once the temperature of the clutch oil reduces acceptably (as explained above).

The baling machine 10 optionally may include one or more input devices 77, represented schematically and non-limitingly in FIG. 1, by means of which information on the energy transmitted via the power take-off shaft 13 may be input to the microprocessor 44.

In FIG. 1 an input device 77 is shown in the form of a keypad connected to the microprocessor 44 via an electrical cable 78, and using which e.g. the rated power output of the tractor 11 can be input to the baling machine 10. The microprocessor can select a set of decision parameters (such as a selected speed of plunger 23 at which to transition from the first transmission ratio 39, 41 to the second transmission ratio 42, 43) that are optimised for the input power level.

The input device 77 may take a variety of other forms. These include but are not limited to a code reader that can read a code printed or affixed on part of the tractor 11, e.g. adjacent the PTO; a near-field communications (NFC) device that establishes a communications link with a microprocessor forming part of the tractor 11 in order to download power output information; or a cable connection between the microprocessor 44 and a counterpart controller forming part of the tractor 11.

The transmission 38 in optional embodiments includes a rigid housing 79 that may be formed e.g. by casting from a metal alloy, especially a high stiffness, lightweight alloy.

As explained the baling machine 10 includes a number of frame elements 17. The housing 79 may be positioned to interconnect two or more such frame members (e.g. frame members 17a and 17b as non-limitingly illustrated in FIG. 1) in a manner enhancing the stiffness of the frame 17 of the baling machine 10.

In the illustrated embodiment such interconnection is achieved by way of perforated lugs 81, 82 by means of which the housing 79 is bolted to interconnect two frame members, but as will be apparent to the person of skill in the art such interconnection may be achieved in a variety of alternative ways.

The layout of the components of the transmission 38 inside the housing 79 is such that the drive train components 39, 41 defining the first transmission ratio occupy a first vertically extending distance in the housing 79; and the drive train components 42, 43 defining the second transmission ratio occupy a second vertically extending distance in the gearbox housing, the upper limit of the second vertically extending distance terminating below the upper limit of the first vertically extending distance.

This means that the transmission 38 is compact in the longitudinal dimension of the baling machine 10, and also that the output of the transmission 38 is connected to the flywheel shaft 29 at a relatively high point in the baling machine 10. This provides several advantages in terms of transferring drive input via the input shaft 27 to the location of the plunger 23, which as mentioned is located relatively high inside the baling machine 10.

As the foregoing makes clear, the transmission 38 includes at least one clutch, and in the described embodiment a plurality of clutches, that deal with the selection of gear ratios during start-up of the plunger in a manner that takes account of slip. As a consequence there is no need to provide a flywheel slip clutch as in the prior art.

FIGS. 1 to 3 show an embodiment including a simple version of flywheel shaft 29, for purposes of illustrating the principles of the invention. In these figures the flywheel shaft 29 is shown as a plain cylindrical shaft; but in practical variants of the invention a need may arise for a different, and slightly more complex, form of the flywheel shaft 29. An example of such an embodiment is illustrated in FIGS. 4 and 5.

Flywheel shaft 29 of FIGS. 4 and 5 includes at each end a respective universal joint 81, 82. Such joints are needed to accommodate tolerancing and manufacturing variations in the components making up the driveline; and also to take account of flexing that may occur in the frame of the baling machine 10 and the frame 17. Thus the flywheel shaft 29 includes at least one, and in optional embodiments two, two degree-of-freedom joints as illustrated.

Overall the driveline described herein provides numerous advantages over the prior art, and in particular removes the need for regular adjustment or servicing of a flywheel slip clutch.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A baling machine including a rotary drive-transferring driveline, comprising:
a transmission including at least one clutch;
a rotary input shaft that is connected to provide a rotary drive as an input to the transmission;
a flywheel shaft supporting a flywheel that is rotatably driven as an output of the transmission and connecting directly or indirectly to a plunger of the baling machine, the transmission being drive-transferringly interposed between the input shaft and the flywheel shaft, the at least one clutch configured for selectively drivingly connecting the input shaft and the flywheel shaft one to the other inside the transmission,
wherein the input shaft rigidly connects to an input gear shaft, and
wherein the input gear shaft is locked to an input side of the at least one clutch.

2. The baling machine according to claim 1, wherein the flywheel shaft includes at least a first two degree-of-freedom joint.

3. The baling machine according to claim 2, wherein the flywheel shaft includes a second two degree-of-freedom joint.

4. The baling machine according to claim 2, wherein the first two degree-of-freedom joint includes a universal joint.

5. The baling machine according to claim 1, wherein said transmission includes at least one drive train including at least two meshing gears and the at least one clutch.

6. The baling machine according to claim 1, wherein the at least one clutch is a spooled wet clutch.

7. The baling machine according to claim 1, wherein the at least one clutch is a spring-biased, electro-hydraulically actuated clutch.

8. The baling machine according to claim 1, further comprising the flywheel and the plunger.

9. The baling machine according to claim 5, wherein the transmission comprises two clutches, each clutch being assigned to a drive transfer path, the drive transfer paths having different transmission ratios and a common output, wherein only one drive transfer path at a time is operatively connected in the transmission.

10. The baling machine according to claim 9, wherein the clutches control which of the drive transfer paths is engaged.

11. A method for transmitting power in a baling machine including a rotary drive-transferring driveline, comprising the steps of:

providing a transmission, a rotary input shaft, and a flywheel shaft, the transmission including at least one clutch and being interposed between the input shaft and the flywheel shaft, the flywheel shaft supporting a flywheel and connecting directly or indirectly to a plunger of the baling machine;

transferring drive power by way of the transmission from the input shaft to the flywheel shaft, the input shaft inputting a rotary drive to the transmission, the flywheel shaft being rotatably driven as an output of the transmission; and selectively drivingly connecting the input shaft and the flywheel shaft one to the other inside the transmission by way of the at least one clutch, wherein the input shaft rigidly connects to an input gear shaft, and wherein the input gear shaft is locked to an input side of the at least one clutch arranged inside the transmission, so that the input side also rotates with the input gear shaft.

12. The method of claim 11, wherein the flywheel shaft includes at least a first two degree-of-freedom joint.

13. The method of claim 12, wherein the first two degree-of-freedom joint includes a universal joint.

14. The method of claim 11, wherein the transmission includes at least one drive train including at least two meshing gears and the at least one clutch.

15. The method of claim 11, wherein said at least one clutch is one of a spooled wet clutch and a spring-biased, electro-hydraulically actuated clutch.

* * * * *